United States Patent

[11] 3,534,787

[72] Inventor  Friedrich Heck
              Deilinghofen, Germany
[21] Appl. No. 701,436
[22] Filed     Jan. 29, 1968
[45] Patented  Oct. 20, 1970
[73] Assignee  Duria-Werk Karl Kempf G.m.b.H.
              Neuss am Rhine, Germany

[54] DEVICE FOR SPRINKLING POWDER ON TO SUPPORTS
     9 Claims, 2 Drawing Figs.
[52] U.S. Cl. .................................................. 141/131,
                                222/196, 222/414, 222/559
[51] Int. Cl. ................................................. B65b 43/42
[50] Field of Search ............................ 141/131(Inquired);
     118/308, 312,(Anti-Offset Digest) 222/290,(Inquired);
                                414, 561, 599, 196; 141/286

[56]              References Cited
               UNITED STATES PATENTS
2,532,584  12/1950  Vagim ............................. 222/414X
2,737,319  3/1956   Rayburn .......................... 222/414X Primary Examiner—Houston S. Bell, Jr.
Attorneys—Curt M. Avery, Arthur E. Wilfond, Herbert L. Lerner and Daniel J. Tick ABSTRACT: A device for sprinkling sintering powder onto a metal plate or strip comprises a feed hopper for the powder with a slot at the bottom through which the powder is fed onto the surface of either a rotating drum, or a moving conveying belt which passes over a circular roller. The powder is moved from the slot by the drum or belt and subsequently falls from the drum or belt on to the plate or strip below. A stationary stop in the form of a taut metal wire or synthetic thread extends across the surface of the drum or across the surface of the belt where it passes around the roller in a position at which the powder is just starting to slip on the curved surface of the drum or belt, that is, at the transition between the region where there is static friction and the region where there is sliding friction between the powder and the drum or belt and this stop causes the powder to fall from the drum or belt at a uniform rate.

DEVICE FOR SPRINKLING POWDER ON TO SUPPORTS

This invention relates to devices for sprinkling powder onto a support, for example, for sprinkling a mixture of metal powders onto sheet metal plates or strips or onto annular supports in a sinter-cladding process, of the kind in which the powder issues from a delivery slot of a feed hopper and so passes onto a conveying means from which it falls onto the surface of the support moving along under the conveying means.

In the process of sinter-cladding, the metal or ceramic raw material which is to form the coating must first of all be sprinkled onto the surface of the support. For this purpose the support is conveyed at a constant speed relative to the sprinkling device. The thickness of the sprinkled layer, and the thickness of the finished coating, is adjusted by adjusting the speed of conveying and/or the rate of feed of the powder.

In order to obtain a finished product of high quality, an even and often a very thin layer of powder must be applied to the support. If the powder is distributed unevenly on the support then, in the sinter-cladding of strip supports, the layer which is subsequently rolled or pressed may have an uneven density. Furthermore, thickness differences and curved or distorted surfaces can occur. Already known sprinkling devices produce an uneven distribution of the powder because the powder is delivered by a feed hopper to a conveyor belt running over deflector rollers. In the region of the front deflector roller the powder falls off the surface of the belt by gravity. There is an extended transition between the region of static friction, where the powder adheres to the surface of the conveyor belt, and the region of sliding friction, where the powder begins to fall away. This extended transition region results in the development of avalanches of powder, resulting in uneven distribution of the powder on the support.

The extended area of the transition zone, between the region of static friction and the region of sliding friction or free fall, depends greatly on the radius of the deflector roller. For this reason deflection rollers of very small radius have been used. A device is also known in which an extremely thin and flexible conveyor belt is led at the delivery end around a very narrow stationary deflector edge. However, although this does decrease the influence of the static friction region, the conveyor belt wears very rapidly due to the sharp bending angle. Furthermore the thin conveyor belt easily wanders sideways and rides over the side stops, rapidly becoming damaged. A sprinkling device for powder mixtures is also known which consists of a conveyor belt travelling over a stationary table. The deflecting edge of the table is equipped with a slot extending over the full width of the conveyor belt. Through this slot compressed air is blown, lifting the powder. The air, passing through the conveyor belt, removes the adhesion between the powder and the surface of the belt, but at the same time causes the falling powder to be distributed in a broader band. This process tends to segregate the powder, which usually consists of lead bronze, gun metal, tin bronze or mixtures of metal with nonmetal substances. In general the powder consists of several different substances of different densities and sometimes different granularities.

The object of the present invention is to overcome these disadvantages of the known devices, and in particular to provide a sprinkling device capable of distributing the powder quite evenly onto the conveying means, and from there onto the support. To this end, according to this invention in a device of the kind described, the conveying means is a moving conveying surface provided at the delivery slot and having a convex curved part over which the powder passes and from which the powder falls, the curved part of the surface being in contact with, or very closely adjacent a stationary sill which extends parallel to the axis of curvature at the transition between the region of static friction and the region of sliding friction between the powder and the surface and which causes the static friction to break down as the powder is moved over the sill.

The conveying means may be a rotary metering drum. However, instead of the rotating metering drum a conveyor belt can instead be mounted at the outlet opening of the feed hopper, the conveyor belt passing around deflector rollers and the sill being positioned in the region of the front deflector roller.

The sill, which is fixed over the metering drum, or conveyor belt, separates the powder from the surface of the drum or conveyor belt, so that the powder passes abruptly, without any delay, from a state of static friction to a state of sliding friction. Consequently a very even distribution of the powder on the support results.

The height of the sill is preferably not greater than the width of the slot between the feed hopper and the metering drum or conveyor belt. In order to allow the sill to be adjusted correctly at the transition line at which if there were no sill the powder would change from a state of static friction to a state of sliding friction, the sill is preferably mounted so that it is adjustable in position, and it preferably consists of a taut metal wire or synthetic thread. Furthermore, by making the front wall of the feed hopper adjustable in position and situated in the region of static friction above the metering drum or conveyor belt, the width of the delivery slot can be made adjustable in width to suit the nature of the powder and the desired layer thickness. Furthermore, the device according to the invention can be equipped with a shaker-conveyor interposed between the metering drum, or conveyor belt, and the support for the powder, the shaker-conveyor delivering the powder evenly from its delivery end onto the support.

Two examples of devices in accordance with the invention are illustrated in the accompanying drawings in which.

Figure 1:
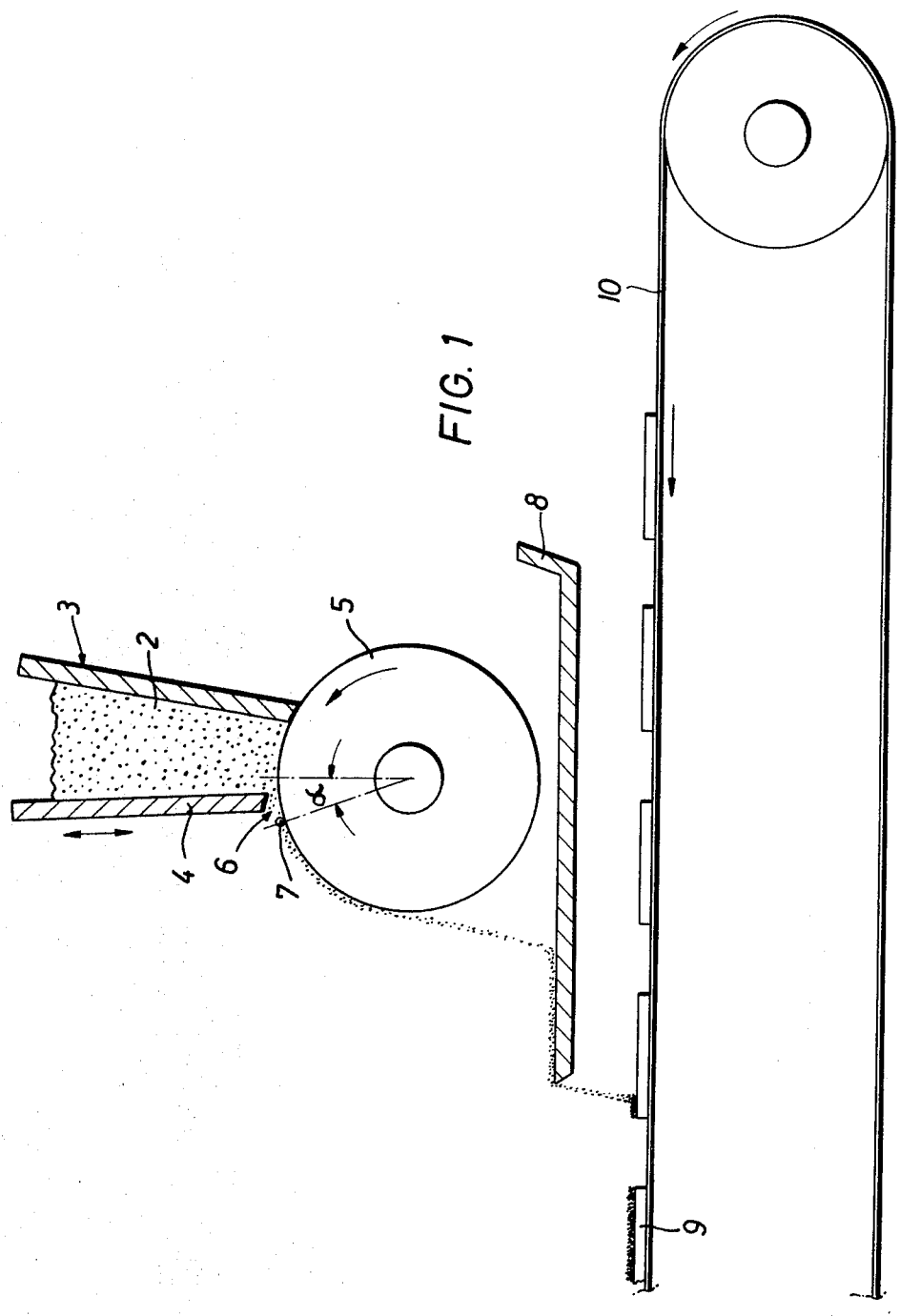
FIG. 1 is a diagrammatic side view of one example.

A mixture of powders 2 is contained in a feed hopper 3 having a front wall 4 which is adjustable in position upwards and downwards. In the example in FIG. 1, the floor of the feed hopper 3 is in the form of a rotating metering drum 5. Between the surface of the drum and the front wall 4 of the feed hopper there is a metering gap 6 of adjustable width through which the powder is taken out of the feed hopper in the direction of rotation of the drum. At the transition between the region of static friction and the region of sliding friction between the powder and the drum, that is to say at the line where the powder begins to fall off the surface of the drum, there is a sill in the form of a taut wire 7 stretched parallel to the surface of the drum and in contact with the surface. The sill is stationary, whereas the drum rotates. The position of the transition zone between the region of static friction and the region of sliding friction is indicated in the drawing by the angle $\alpha$. The position of the transition zone depends on the diameter of the drum and on the nature and granularity of the powder mixture. The sill 7 is therefore made adjustable in position on the surface of the drum, that is to say the angle $\alpha$ can be varied.

Rotation of the metering drum 5 pushes the powder over the sill 7, with the result that as soon as the powder passes over the sill it falls down off the surface of the drum, influenced by its sliding friction. The particles of powder across the width of the drum all fall off the drum simultaneously, that is to say they become detached along a straight line parallel to the axis of the drum.

In practice a moist powder sprinkled to give a thin layer tends to flock, that is to say tends to become distributed in lumps. To overcome this difficulty there can be a shaker-conveyor 8 underneath the metering drum 5. The shaker-conveyor breaks up the lumps of powder. From the sharp delivery edge of the conveyor 8 the powder falls down onto the support 9, which is conveyed along at constant speed under the conveyor 8 and the sprinkler device 3, 5, 7.

Figure 2:
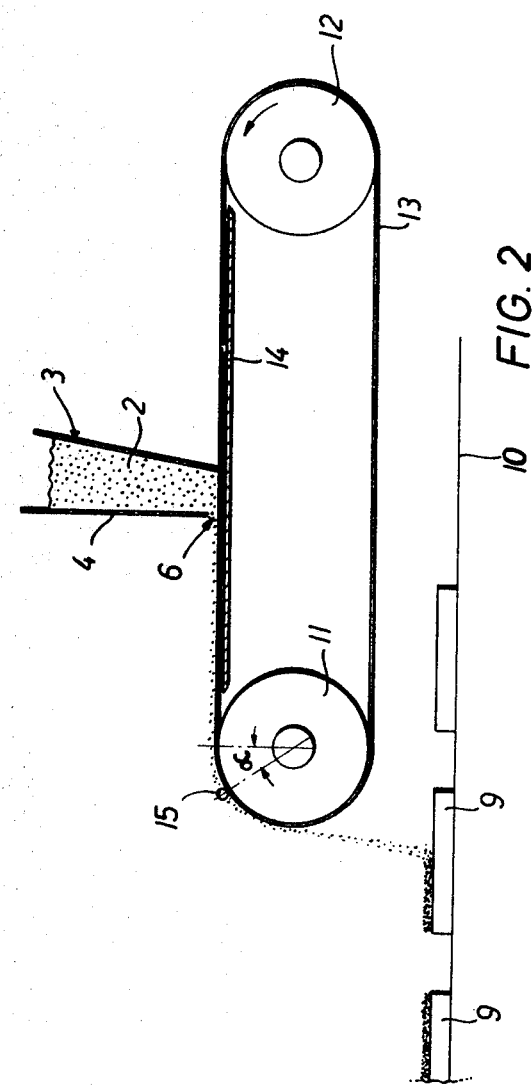
FIG. 2 is a similar view of the second example.

The example shown in the FIG. 2 is of the same construction as the example shown in FIG. 1, except that the metering drum 5 is replaced by a conveyor belt 13 running over rollers 11 and 12. Under the feed hopper 3 the conveyor belt 13 is supported by a stationary table 14. The powder mixture 2 issuing from the feed hopper 3 through the slot 6 is conveyed on the upper surface of the conveyor belt 13. Above the front deflector roller 11 there is a sill 15 extending parallel to the axis of the deflector roller 11 and resting in contact with the surface of the conveyor belt 13. Here again, as in the case of the sill 7 of the sprinkler device of FIG. 1, the sill 15 momentarily lifts the powder from the surface of the belt conveyor 13, at the transition zone between the static friction and the sliding friction region.

If the sprinkling devices were to be operated without the sills 7 or 15, the powder would not release itself evenly from the surface of the metering drum or belt conveyor. There would be an extended transition area between the static friction region and the sliding friction region, where the powder begins to fall. Particles of powder beginning to fall would push other particles along with them, producing small avalanches, so that the layer of sprinkled powder on the support would show a formation of heaps, resulting in an uneven sintered layer.

The result of providing the sills is that the particles fall only when they reach the edge of the sill, and no avalanches can form. It is important to ensure that the sill, consisting of a metal wire or a synthetic thread, rests in contact with or very close to the surface of the metering drum or conveyor belt, so that all the powder passes over the top of the sill. For this purpose the wire or thread is pulled taut. The thickness of the sill depends on the nature of the powder mixture and can be equal to the width of the slot in the feed hopper, or can be less. The position of the sill, that is to say the magnitude of the angle α, is adjusted to suit the particular powder mixture.

I claim:

1. In a device for sprinkling powder on a support, said device comprising a feed hopper, means defining a delivery slot at the bottom of said feed hopper and conveying means for conveying powder from said slot and from which said powder falls onto said support moving therebelow, the improvement wherein said conveying means comprises a moving conveying surface, means mounting said surface for movement past said delivery slot, said conveying surface comprising a curved part over which said powder passes and from which said powder falls, and a stationary sill substantially in contact with said curved part of said surface, said sill extending parallel to the axis of curvature of said curved part of said surface at a location thereof sloping downwardly in the conveying direction of said powder and forming a transition between a region of static friction and a region of sliding friction between said powder and said curved part of said surface.

2. A device as claimed in claim 1, wherein said moving conveying surface comprises a rotary metering drum.

3. A device as claimed in claim 1, wherein said moving conveying surface comprises a conveyor belt and deflector rollers supporting said conveyor belt, one of said rollers being at the front of the operative path of movement of said belt and said sill being positioned in the region of said front deflector roller.

4. A device as claimed in claim 1, wherein the height of said sill is not greater than the width of said slot.

5. A device as claimed in claim 1, further comprising means adjustably mounting said sill for movement along the direction of movement of said moving surface.

6. A device as claimed in claim 1, wherein said sill consists of a taut metal wire.

7. A device as claimed in claim 1, wherein said sill consists of a taut synthetic thread.

8. A device as claimed in claim 1, wherein said feed hopper includes a front wall, a bottom edge on said front wall, said bottom edge and said moving surface defining said slot and means adjustably mounting said front wall for upward and downward movement to adjust the width of said slot.

9. A device as claimed in claim 1, further comprising a shaker-conveyor between said moving surface and the path of movement of said support, whereby said powder is moved by said moving surface and falls from said moving surface onto said shaker-conveyor and from said shaker-conveyor onto said support.